United States Patent [19]

Hartrumpf

[11] Patent Number: 5,146,290
[45] Date of Patent: Sep. 8, 1992

[54] PROCESS AND APPARATUS FOR DETERMINING THE POSITION OF AN OBJECT

[75] Inventor: Matthias Hartrumpf, Karlsruhe, Fed. Rep. of Germany

[73] Assignee: Fraunhofer Gesellschaft zur Forderung der Angewandten for Schung E. V., Fed. Rep. of Germany

[21] Appl. No.: 547,047

[22] Filed: Jul. 2, 1990

[30] Foreign Application Priority Data

Jun. 30, 1989 [DE] Fed. Rep. of Germany ....... 3921661

[51] Int. Cl.$^5$ .......................... G01B 11/26; G01C 3/00
[52] U.S. Cl. ......................................... 356/152; 356/1; 356/141
[58] Field of Search ........................... 356/1, 141, 152

[56] References Cited

U.S. PATENT DOCUMENTS

| | | |
|---|---|---|
| 3,355,590 | 11/1967 | Bertram . |
| 4,477,185 | 10/1984 | Berger et al. ................. 356/1 |
| 4,502,785 | 3/1985 | Truax .......................... 356/1 |
| 4,721,386 | 1/1988 | Collyer ....................... 356/152 |
| 4,888,490 | 12/1989 | Bass et al. ................... 356/1 |

FOREIGN PATENT DOCUMENTS

| | | |
|---|---|---|
| 3205362 | 8/1983 | Fed. Rep. of Germany . |
| 3611896 | 10/1987 | Fed. Rep. of Germany . |
| 3710068 | 10/1987 | Fed. Rep. of Germany . |
| 3714776 | 11/1988 | Fed. Rep. of Germany . |

Primary Examiner—Stephen C. Buczinski
Attorney, Agent, or Firm—Evenson, Wands, Edwards, Lenahan & McKeown

[57] ABSTRACT

A process and an apparatus determines the position of an object by triangulation. In order to determine the location of an object, two illumination light beams coming from different directions are aimed at a reflector attached to the object and the reflected beams are detected by a location-sensitive sensor. In order also to detect the rotation position of the object, the reflector is partially mirrored so that a part of the illumination light beams striking thereon pass through it. The laser beams passing through the retro-reflector are detected in a sensor plane, which is spaced at a distance from the center of the reflector.

13 Claims, 2 Drawing Sheets

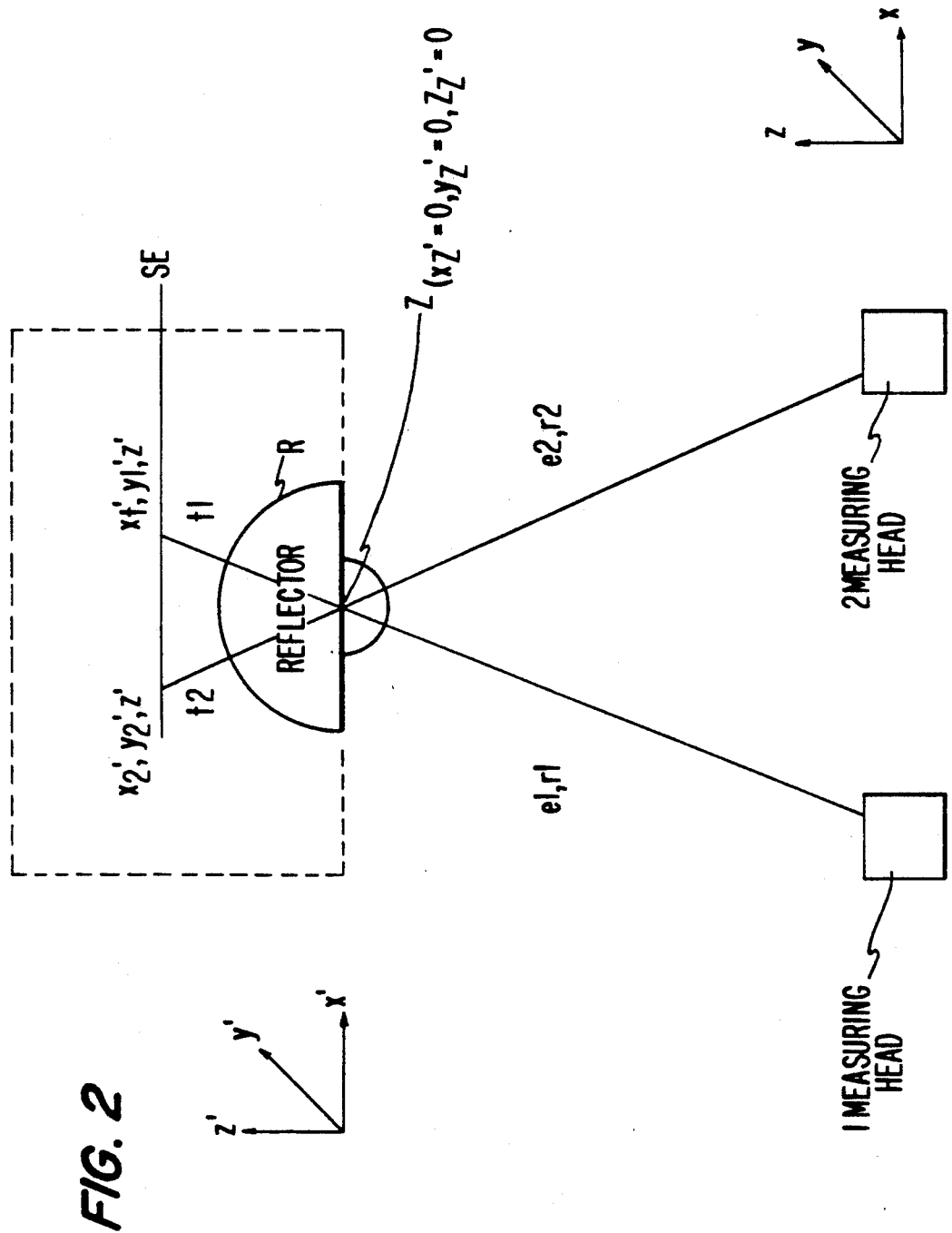

PROCESS AND APPARATUS FOR DETERMINING THE POSITION OF AN OBJECT

BACKGROUND AND SUMMARY OF THE INVENTION

The present invention relates to a process and an apparatus for determining the position of an object, in particular of a moving object and, more particularly, to such a process and apparatus which utilizes two illumination light beams coming from different directions and aimed at a reflector attached to an object whose position is to be determined so as to be able to detect rotation of the object.

Determining the location of an object by triangulation is generally known, for example, from geodesy. Reference is made to the article in FhG-Berichte 3-88, pages 30-33, only by way of example and, moreover, expressly for the explanation of all terms not made more apparent herein.

A process for determining the location of an object operating on the known principle of triangulation, in which a point of the object is automatically fixed from two measuring heads located at different points with one respective laser beam, is known from the above-mentioned article. The laser beams emitted from each measuring head strike a special reflector attached to the object to be measured and are reflected by this special reflector in parallel to the incidence direction. Insofar as the laser beam does not strike the center of the reflector, it is displaced in parallel to the incident beam. This parallel displacement of the reflected beams is registered by the two measuring heads with position-sensitive diodes (so-called posicons). The output signals of the posicons are applied as an input signal to a digital readjustment control which adjusts the beam orientations via motor-driven rotating mirrors in such a manner that the laser beams "strike" the center of the reflector. Subsequently, the point of intersection of the two beams, i.e. the position of the center of the reflector, is determined by continuously measuring the space angle of the beam with triangulation calculations. In order to do so, the positions of the two measuring heads (i.e. of the fulcrums of the two beams) must be known exactly. The positions of the measuring heads are determined semi-automatically in a reference run when the entire system is set up. In this manner, precise, external measurement of the position of the moving object occurs without contact or retroaction.

With this known process, the translation of the object, respectively of the object coordinate system $x'$, $y'$, $z'$, can be determined in relation to the external coordinate system x, y, z of the permanently installed measuring heads. This prior art process can, for example, be employed to determine "on-line" the location of a robot hand, i.e. the Cartesian coordinates of the point aimed at in space. By virtue of this independent, external measuring system, robots, precision handling and processing machines and the like, in the case of which the usual indirect position measurement via the positions of individual axle drives are falsified or rendered inaccurate by elasticities, play, etc. in the drive elements, can be measured and controlled exactly.

The process known from the above-mentioned FhG-Berichte 3-88 article, pp. 30-33, and the corresponding apparatus, permit very exact determination of the coordinates of a point of, in particular, a moving object relative to the location of the two measuring heads. It is not possible, however, to detect a rotation of the object about the center of the reflector.

Therefore it is an object of the present invention to provide a process and an apparatus which permit, in addition to determining the location of, in particular, a moving object, also detection of rotation of the object.

A feature of the present invention is a partially mirrored reflector. Due to the partial mirroring of the reflector, the beams emitted from the two measuring heads are reflected in parallel to themselves and thereby, the position of the object can be determined by means of triangulation. The two beams pass through the reflector and are detected in the sensor plane. Thus the rotation position of the receiver system can be determined via the point of impact in the sensor plane when the distance of the sensor plane to the center of the reflector is known.

With the present invention, all six degrees of freedom of the receiver system, i.e. of the reflector and the collocated location-sensitive sensors in the system of coordinates $x'$, $y'$, $z'$ collocated to the receiver system, can be determined. As the receiver system in and on the object to be measured is fixed, the object to be measured is also precisely defined as to its location and rotation position.

According to another feature of the present invention, the reflection properties of the reflector permit detecting the difference in position with the aid of position-sensitive sensors so that the light beams and, in particular, the laser beams can always be adjusted to the zero point, i.e. to the center of the reflector, with an adjustment control. With this embodiment, the position can be determined in addition to determining the location.

BRIEF DESCRIPTION OF THE DRAWINGS

Other objects, advantages and novel features of the present invention will become apparent from the following detailed description of the present invention when considered in conjunction with the accompanying drawings wherein:

FIG. 2 is a schematic representation of a portion of the apparatus which permits determining the rotation position.

DETAILED DESCRIPTION OF THE DRAWINGS

Figure 1:
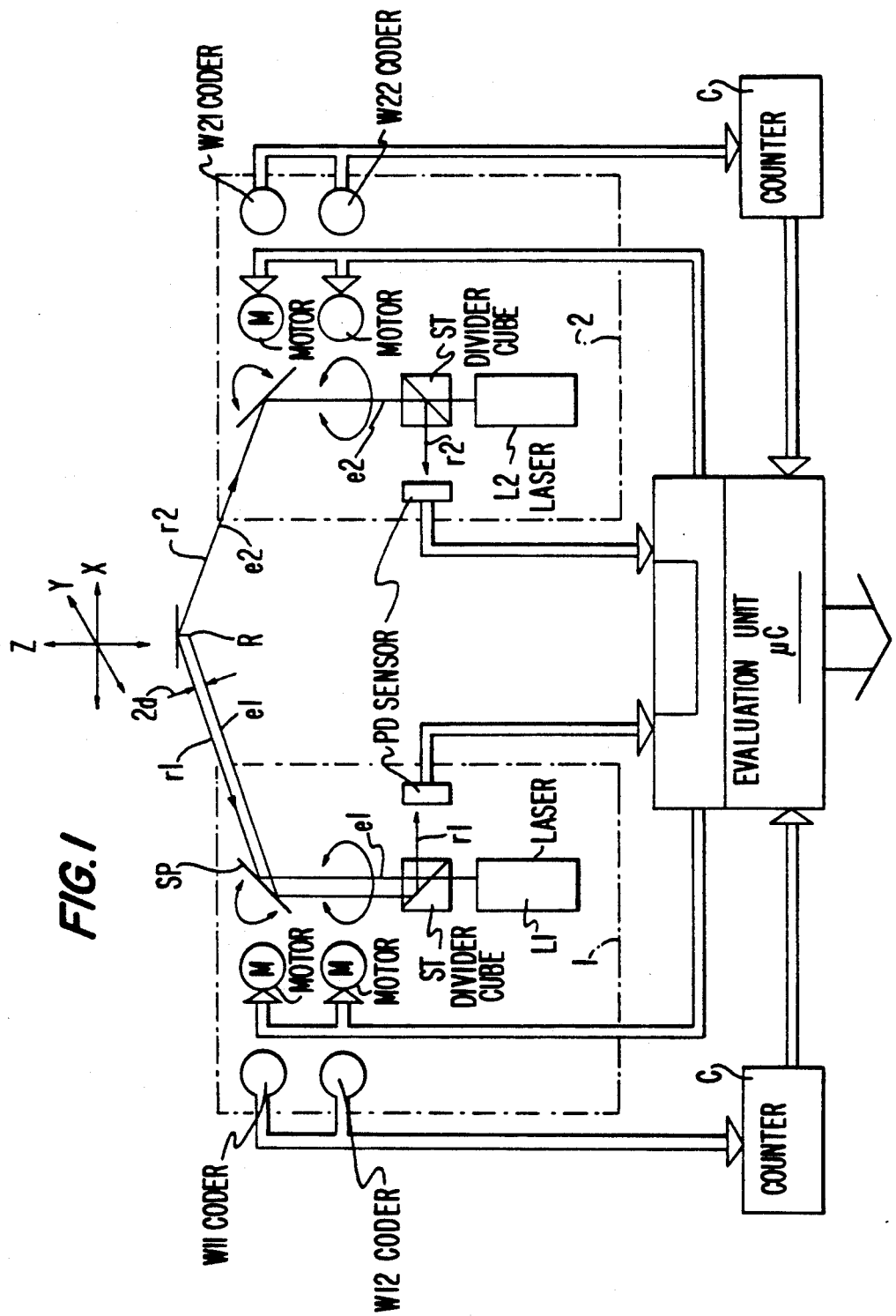
FIG. 1 is a schematic view of a portion of an apparatus of the present invention which permits determining the location of an object by triangulation.

FIG. 1 shows a portion of an apparatus in accordance with the present invention which permits a determination of the location of an object. Attached to the object, which is not depicted in detail, is a reflector R, which reflects a beam incident in the distance d of the reflector R from the center Z (see FIG. 2) in parallel and displaced by a path distance 2d. This parallel displacement of the reflected beam is independent of the angle of incidence of the striking beam.

The apparatus is provided with two measuring heads 1 and 2 arranged at different points and each comprising a laser L1 and L2, such as, for example, a HeNe laser. Each laser beam e1, e2, (also see FIG. 2) penetrates a beam divider cube ST which is functionless in the illumination beam path, and is reflected at a moveable surface mirror Sp to the reflector R.

Each beam r1, r2, reflected at reflector R is reflected at mirror Sp and guided through beam divider cube ST to the location-sensitive sensor PD. In the case of continuous-wave lasers, it is advantageous to utilize a CCD matrix or a PSD matrix, and in the case of pulsed lasers a position-sensitive photodiode (i.e., a posicon or position-sensitive device).

Each mirror Sp can be rotated about an axis of rotation, which coincides with the respective laser beam e1, e2, and can be swivelled about a swivel axis, which is perpendicular to the axis of rotation and intersects the latter at the point of impact of the laser beam on mirror Sp. Lasers L1 and L2 are aligned for this purpose in the respective measuring head such that their beam lies exactly in the respective axis of rotation and strikes the mirror surface at the point of intersection of both axes. Beam divider cube ST and sensor PD rotate about the axis of rotation together with mirror Sp.

Both laser beams are focussed with a corresponding optical system (not depicted in detail), via the entire beam distance (including the beam divider ST and reflector R) to the respective sensor PD in order to keep the spot of light there as small as possible.

Motors M move mirrors Sp about the individual axes, and are regulated by the adjustment portion of a central control and evaluation unit given the overall designation $\mu C$, the function of which will be made more apparent below. Generally, speaking the central control processor $\mu C$ performs three essential functions, namely adjustment, determination of measurement values by triangulation and—only needed when setting up the system referring to references.

The rotation of mirror Sp about the individual axes is detected with incremental angle coders WK11 ... WK22, which are arranged on the respective axes and the output signal of which is applied to an evaluation portion of the control and evaluation unit $\mu C$ via repetitive counters C.

FIG. 2 shows the two measuring heads 1 and 2 schematically. The laser beams e1 and e2 are emitted from the heads 1, 2 and at the center Z of reflector R, which is attached to an object 3, the position of which is to be determined. Furthermore, an external coordinate system x, y, z, is permanently fixed to the two measuring heads 1 and 2, and a coordinate system x', y', z' is permanently fixed to the object to be detected. The zero point of the latter coordinate system lies in center Z of reflector R.

Because the reflector R is only partially mirrored, only a portion r1 and r2 of the incident light beams e1, e2 is reflected, and with the other portion t1 and t2 passes through the partially mirrored reflector R. Location sensitive sensors SE are arranged at a distance 2' behind the center 2 to determine the point of intersection of the plane of the sensors SE and the beams t1 and t2 passing through the reflector, i.e. the coordinates $x'_1$, $y'_1$, z' and $x'_2$, $y'_2$, z'. The output signals of the sensors SE are also transmitted to the control and evaluation unit $\mu C$.

If posicons are employed, preferably two posicons are used for an unequivocal separation of the two points of impact of the beams. If needed, optical elements, such as lenses, beam dividers, etc., may be connected before the posicons. Of course, a CCD unit with corresponding selection electronics permitting separation of the two points of impact of the beams can, however, also be utilized.

In the following discussion, first the determination of the location of the object, i.e. the determination of the Cartesian coordinates of a point on the object, will be made more apparent with reference to FIG. 1 and subsequently the determination of the position of the object will be described with reference to FIG. 2.

Laser beams e1 and e2 emitting from each measuring head 1, 2, respectively strike the reflector R fixed to the object, whose position is to be determined, and are reflected therefrom in parallel. When the beams striking the reflector deviate from its center Z (FIG. 2), the result is a parallel displacement of the reflected beams which is detected by the location-sensitive sensors PD. The output signals of sensors PD are transmitted as input signals to the adjustment part of control and evaluation unit $\mu C$, which, by way of example, can be a conventional commercial computer with collocated interface units. The unit $\mu C$ adjusts the beam orientations via the motor-driven rotating mirrors Sp in such a manner that center Z of the reflector R is always aimed at.

The evaluation part of unit $\mu C$ calculates the point of intersection of both beams, i.e. the position of the reflector R, by a triangulation from the space angles of the beams being continuously measured by the angle coders WK11 ... WK22. In order to do so, the positions of the two measuring heads, i.e. the beam fulcrums, have to be known exactly. The former are determined semi-automatically in a reference run when the entire system is set up as previously noted.

A calculation of the beam paths in the receiver coordinate system x', y', z', which is determined by sensor plane SE and center Z follows from the output signals of the sensor or the sensors SE and the position to be measured once of reflector center Z relative to the sensor plane. As the courses of the beams and the position of center Z of reflector R in the external coordinate system x, y, z can be ascertained as previously described by triangulation, the translation and rotation of the receiver coordinate system x', y', z' can be determined in relation to the external coordinate system x, y, z.

A simple algorithm may be used for this purpose and can be derived as follows. If, with the position of center Z of reflector R being unchanged, the object 3 is rotated about the z' direction, the result is a circular movement of the points of intersection of beams t1 and t2 and sensor plane SE. Rotating the object 3 about the x' axis, on the other hand, results in the points of intersection being shifted in the y' direction with the x' positions practically remaining constant. Likewise, rotating the object 3 about the y' axis results in the points of intersection being shifted in the x' direction with the y' positions remaining practically constant.

Although by way of a conventional laser triangulation system only both systems of coordinates can be measured in comparison, an additional measurement of the rotation of the receiver coordinate system can occur in accordance with the present invention in comparison to the external system of coordinates. After gauging the system only once (i.e. determination of the transformation of the coordinates between predetermined external coordinate system x, y, z, the coordinate system of the measuring heads and the object coordinate system), an external measurement of the position and the orientation of the object to be measured can occur.

The control and evaluation unit $\mu c$ converts, for example, in a posicon electronic system, the differential currents of the location-sensitive posicon diodes into voltages which are proportional to the shifting of the spot of light on the active area of the sensor. By normalizing with an aggregate signal proportional to the overall incident intensity, the output signals become independent to a large extent of the light intensity. In addition, each signal detects the aggregate signal in order to decide if the reflected beam strikes the sensor at all, i.e. if the adjustment can operate.

Following analog/digital (A/D) conversion, a control processor with the usual peripherals calculates from the output signals of sensors PD, the allocated values for the motor regulation signals and prepares them in order to regulate the motors, which, for example, can be D.C. motors. The counters C count the angle increments of the four angle counters WK11 ... WK22. Knowing the zero positions, readings of the four counters yield the four space angles of laser beams e1 and e2.

Although the invention has been described and illustrated in detail, it is to be clearly understood that the same is by way of illustration and example, and is not to be taken by way of limitation. The spirit and scope of the present invention are to be limited only by the terms of the appended claims. For example, more than one position-sensitive sensor, e.g. two sensors which are spaced at different distances from the center 2 of the reflector R, can be provided for each beam t1, t2, respectively, to subsequently permit measuring the direction and position of the point of impact of beams t1 and t2 with an collocated optic (collecting lens) and a beam divider even if no adjustment of beams e1 and e2 in the center 2 of reflector R occurs.

What is claimed is:

1. A process for determining a rotation position and orientation position of an object, comprising the steps of aiming two illumination light beams coming from different directions at a partially-mirrored reflector attached to said object, detecting the orientation position of said object by detecting reflected beams from said partially-mirrored reflector via respective location-sensitive sensors, and detecting the rotation position of said object by passing a part of the illumination light beams striking said partially-mirrored reflector through said partially-mirrored reflector and detecting the beams passing through said partially-mirrored reflector in a sensor plane which is spaced from a center of said partially mirrored reflector.

2. An apparatus for determining the position of an object by triangulation, comprising
two illumination light sources aiming two illumination light beams from different directions to at least one partially mirrored reflector attached to said object,
a location-sensitive sensor unit for each illumination light beam reflected from said reflector, and operatively connected with an evaluation and control unit, the output signal of the sensor unit being transmitted to the evaluation and control unit c, and
at least one additional location-sensitive sensor upon which said light beams passing through said reflector strike arranged in a plane which is spaced at a distance from said center of said at least on refelector, and said evaluation and control unit operatively connected with said at least one additional location-sensitive sensor to determine the rotation position of said object from the output signals of aid at least one additional location-sensitive sensor.

3. The apparatus according to claim 2, wherein said evaluation and control unit is operatively configured to adjust said illumination light beams such that the beams always strike in said center of said reflector.

4. An apparatus according to claim 3, wherein a mirror is arranged in the path of each said beam and is adjustably rotatably by a control unit about an axis, said axis coinciding with said illumination light beam striking said mirror and being swivelable about a swivel axis perpendicular to and intersecting the axis of rotation at the point of impact of the beam.

5. The apparatus according to claim 4, wherein a beam divider for aiming said reflected light beam at said location-sensitive is provided in said light path between said mirrors and each of said illumination light sources.

6. The apparatus according to. claim 5, wherein said beam divider and said sensor can be rotated about the axis in conjunction with said mirror, said last-mentioned axis coinciding with said illumination light beam.

7. The apparatus according to claim 4, wherein angle transmitters are operatively arranged in relation to said mirorrs to detect the swivelling and rotation of said mirrors in each beam path, and said evaluation and control unit is operatively configured to utilize the output signal of said angle transmitters for determining the location of said object.

8. The apparatus according to claim 2, wherein said location-sensitive sensors are position-sensitive diodes.

9. The apparatus according to claim 2, wherein at least two location-sensitive sensors are provided in the beam path of said beams passing through said reflector.

10. The apparatus according 8, wherein at least one of a lens system and a beam divider is arranged between said reflector and said sensor plane.

11. The apparatus according to claim 3, wherein said location-sensitive sensors are CCD sensors.

12. The apparatus according claim 9, wherein at least one of a lens system and a beam divider is arranged between said reflector and said sensor plane.

13. The apparatus according claim 2, wherein at least one of a lens system and a beam divider is arranged between said reflector and said sensor plane.

* * * * *